United States Patent [19]
Béliveau

[11] Patent Number: 5,568,153
[45] Date of Patent: Oct. 22, 1996

[54] INDIVIDUALLY DEFINED PERSONAL HOME AREA FOR SUBSCRIBERS IN A CELLULAR TELECOMMUNICATIONS NETWORK

[75] Inventor: André Béliveau, Laval, Canada

[73] Assignee: Telefonaktiebolaget LM Ericsson, Stockholm, Sweden

[21] Appl. No.: 454,414

[22] Filed: May 30, 1995

[51] Int. Cl.⁶ ............................................. G01S 5/02
[52] U.S. Cl. ........................... 342/357; 379/59; 379/60; 455/33.1; 455/33.2
[58] Field of Search ..................... 342/357; 379/59, 379/60; 455/33.1, 33.2

[56] References Cited

U.S. PATENT DOCUMENTS

| | | | |
|---|---|---|---|
| 5,043,736 | 8/1991 | Darnell et al. | 342/357 |
| 5,155,689 | 10/1992 | Wortham | 364/460 |
| 5,208,756 | 5/1993 | Song | 364/449 |
| 5,235,633 | 8/1993 | Dennison et al. | 379/60 |
| 5,243,530 | 9/1993 | Stanifer et al. | 364/452 |
| 5,327,144 | 7/1994 | Stilp et al. | 342/387 |

*Primary Examiner*—Gilberto Barrón, Jr.
*Assistant Examiner*—Dao L. Phan
*Attorney, Agent, or Firm*—Smith & Catlett, P.C.

[57] ABSTRACT

A system and method for establishing and administering personal home areas for subscribers of a cellular telecommunications network. The system enables one or more Home areas to be designated for each subscriber. The Home areas may vary in size, and the system is capable of applying a different set of service parameters inside an area and outside the area. Each Home area is defined by designating the latitude and longitude coordinates, and the altitude of a subscriber's home location, as well as the radius of the Home area from the home location. A system operator may designate one of several alternate radii by entering the coordinates of the center of the area at various levels of precision, each of which corresponds to a different Home area radius.

12 Claims, 4 Drawing Sheets

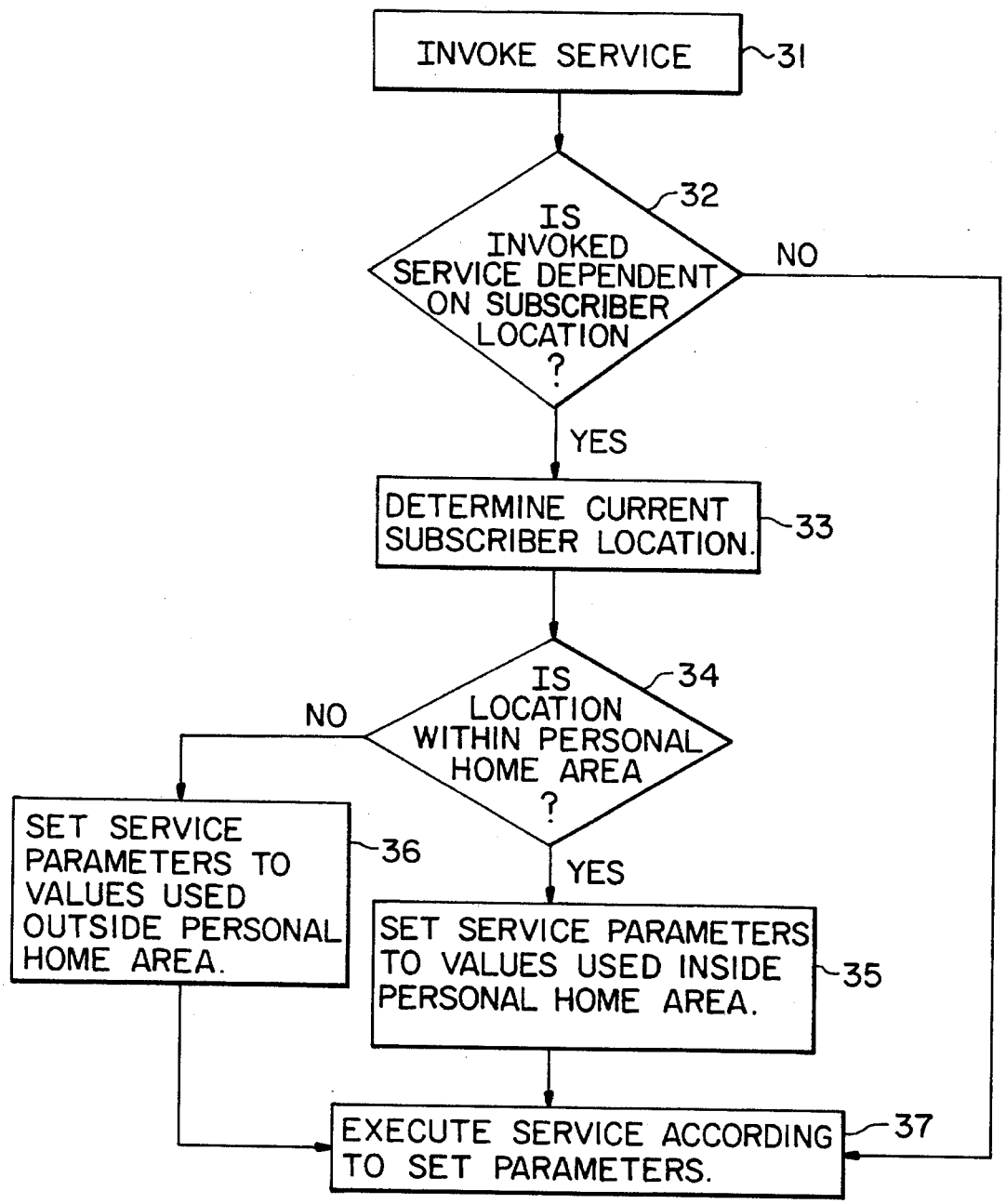

INDIVIDUALLY DEFINED PERSONAL HOME AREA FOR SUBSCRIBERS IN A CELLULAR TELECOMMUNICATIONS NETWORK

BACKGROUND OF THE INVENTION

1. Technical Field of the Invention

This invention relates to cellular telecommunications systems and, more particularly, to a system and method for defining personal home areas for individual subscribers of telecommunications services.

2. Description of Related Art

As the use of cellular telephones spreads, the number of network operators who compete to provide telecommunication services to subscribers is also increasing. Each operator, moreover, desires to offer unique services which distinguish the operator from its competition. One such way to distinguish the service provided to subscribers is to offer increased levels of individual service tailoring. Individually defined service, however, comes only at the expense of increased data storage and data transmission requirements. Cellular equipment providers have not designed cellular networks to handle many of the contemplated data storage and interchange requirements. As a result, only limited tailoring of individual services has been implemented. For example, operators may now offer subscribers the choice of having cellular service only in a downtown area, or for a higher cost, having service which includes the suburbs as well.

With the advent of personal communication services (PCS), operators desire to offer more complete programs of individual service definition. Under an exemplary plan, a subscriber may be offered cellular services at a flat rate when at home or in his neighborhood, at a reduced rate (per minute) when at work (or at a second home), and at a standard (full) rate elsewhere. The sizes of the "Home" and "Work" areas as well as the rates charged may be individually defined for each subscriber.

In order to implement such a plan, subscribers must be able to designate on an individual basis the areas to be designated as Home and Work. Additionally, the cellular system must be able to determine when the subscriber is located in one of the designated areas, and be able to apply the appropriate billing rate based on the subscriber's location. Area designations may be recorded in each subscriber's home location register (HLR); however, IS-41 makes no provision for this function and an existing system is limited to transporting 1,024 different areas between the HLR and the mobile switching center (MSC). This may cover the need for today's market, but when the need arises to provide a Home area for each subscriber, the number of different areas will increase significantly, and may reach several hundred thousand to a million different Home areas for each HLR.

It may be possible to accomodate this need using today's technology, but such a solution suffers from several severe disadvantages. First, the Home area information for each mobile subscriber must be passed to visited MSCs whenever the subscriber designates a Home area and a Work area (or a second Home area) in a different exchange controlled by a different MSC. Second, since the number of subscribers who will require this service cannot be accurately estimated, the design of future HLRs is uncertain. Third, the administration of this home area data becomes extremely difficult, and requires large amounts of data handling resources when the number of subscribers gets very large. HLR administrators must pass data to visited MSCs defining the Home areas of potentially millions of subscribers, and must keep track of the different rates charged each subscriber at different times and in different areas.

One possible solution to simplify the data handling problem is to designate each subscriber's Home area simply as the Cell in which the subscriber's residence or office is located. However, this solution poses several problems. First, as system capacity increases, additional cells are added and individual cell sizes become smaller. Therefore an operator may have to designate several cells instead of a single cell to represent the Home area of some subscribers. Second, cell planning requires the redistribution of cells from time to time as population growth in some areas exceeds local cell limitations. Thus, the cell information of each subscriber would have to be changed to reflect the new cell planning information. Finally, under existing cellular telecommunications standards, the HLR does not record any specific cell information. Instead, the geographic disposition of cells is handled by the mobile switching centers (MSCs).

Although there are no known prior art teachings of a solution to the aforementioned deficiencies, a number of prior art references exist that discuss subject matter that bears some relation to matters discussed herein. Such prior art references are U.S. Pat. Nos. 5,327,144 to Stilp et al., 5,235,633 to Dennison et al., and 5,043,736 to Darnell et al. Each of these references is discussed briefly below.

U.S. Pat. No. 5,327,144 to Stilp et al. (Stilp) discloses a cellular telephone locating system. Stilp calculates the location of mobile stations operating within a given area by measuring the differences in times of arrival of mobile station transmissions at several cell sites. Stilp suggests that location data may be merged with billing data to generate modified billing data, for example, lower rates when calling from a particular geographic locale. However, Stilp only discloses means for locating mobile stations, but does not disclose any means for establishing and administering geographic areas within a cellular telecommunications network. Additionally, Stilp does not disclose any means for defining and administering personal home areas on an individual subscriber basis.

U.S. Pat. No. 5,235,633 to Dennison et al. discloses a cellular telephone system that uses the geographic location of a mobile station to make call management decisions such as selection of a cell site most appropriate for the mobile station. The geographic location of the mobile station is determined using a NAVSTAR global positioning system (GPS) or its equivalent. However, like Stilp above, Dennison does not disclose any means for establishing and administering geographic areas within a cellular telecommunications network.

Finally, U.S. Pat. No. 5,043,736 to Darnell et al. discloses a cellular position locating system for locating the geographic coordinates of a person at a remote location using a portable hand-held unit and a cellular telephone system. However, like Stilp and Dennison above, Darnell does not disclose any means for establishing and administering geographic areas within a cellular telecommunications network.

Review of each of the foregoing references reveals no disclosure or suggestion of a system or method such as that described and claimed herein. It would be a distinct advantage to have a system and method for defining personal home areas for individual subscribers of cellular telecommunications services that establishes and administers personalized geographic areas within a cellular telecommunications network in an efficient manner with a minimum of data handling resources. The present invention provides such a system and method.

SUMMARY OF THE INVENTION

In one aspect, the present invention is a system for administering a personal home area for a subscriber within a cellular telecommunications network having a plurality of cell sites. The system comprises a home location register that stores geographic coordinates of a home location for the subscriber and means for defining a personal home area centered on the home location of the subscriber. The system also includes means for determining a current geographic location of the subscriber upon invoking a service and means for determining whether the current geographic location of the subscriber is located within said personal home area. Finally, the system includes means for setting parameters for the service to values used inside the personal home area upon determining that the subscriber is located within the personal home area, and means for setting parameters for the service to values used outside the personal home area upon determining that the subscriber is not located within the personal home area.

In another aspect, the present invention is a method of administering a personal home area for a subscriber within a cellular telecommunications network having a plurality of cell sites. The method begins by storing in a home location register, geographic coordinates of a home location for the subscriber and defining a personal home area centered on the home location of the subscriber. The method then determines a current geographic location of the subscriber upon invoking a service and determines whether the current geographic location of the subscriber is located within the personal home area. Finally, the method includes the steps of setting parameters for the service to values used inside the personal home area upon determining that the subscriber is located within the personal home area, and setting parameters for the service to values used outside the personal home area upon determining that the subscriber is not located within the personal home area.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 4 is a flow chart illustrating the functions performed by a telecommunication system in which the present invention has been implemented and when a telecommunication service is invoked for a subscriber.

DETAILED DESCRIPTION OF EMBODIMENTS

Figure 1:
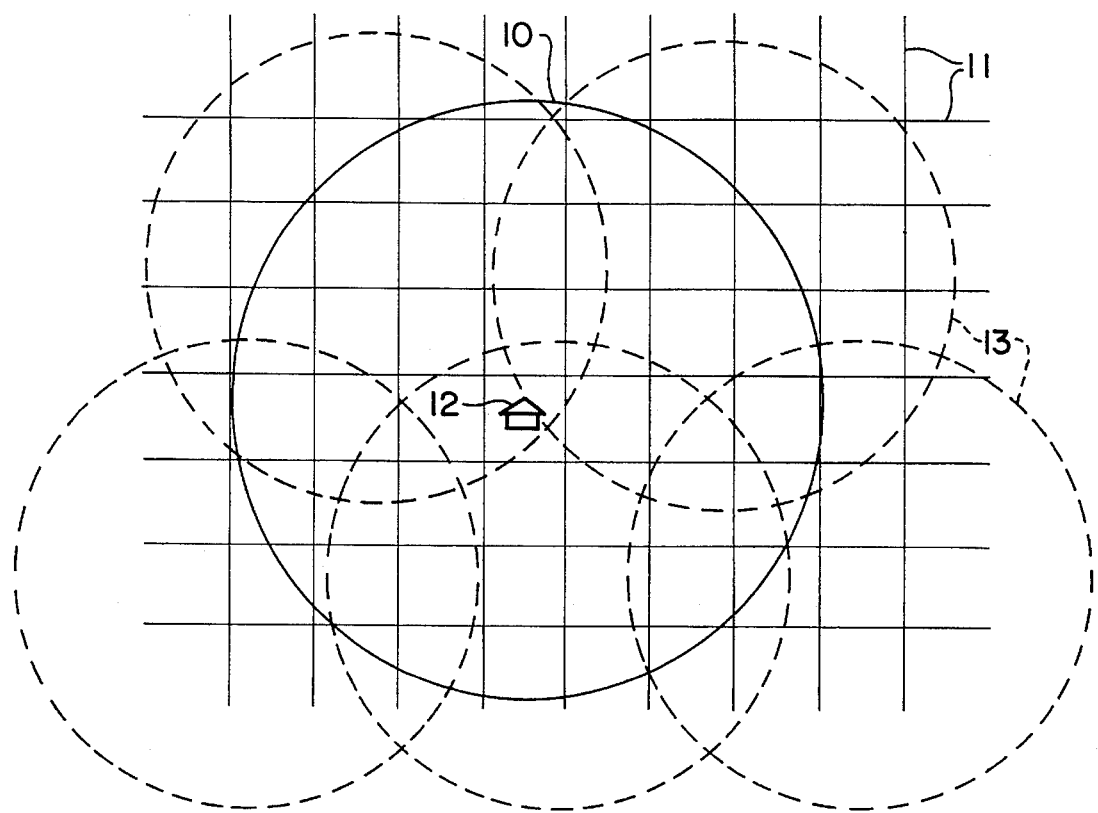
FIG. 1 is an illustrative drawing of a personal home area designated in accordance with the teachings of the present invention.

FIG. 1 is an illustrative drawing of a personal home area 10 designated in accordance with the teachings of the present invention. The personal home area 10 overlies a number of city streets 11 and is centered on a subscriber's home street address 12. Also pictured as dotted lines are cells 13 from a cellular telephone network covering the area of the subscriber's personal home area 10. In the preferred embodiment of the present invention, the geographic location of each subscriber's home street address 12 represents the subscriber's Home location. Such information is readily available from topographical maps and governmental agencies which posses information relating street names and addresses with geographic coordinates for latitude, longitude, and altitude. An operation support system (OSS) for the telecommunications network stores this information in a database for street addresses within the service area of the network. When setting up a Personal Home Area, the OSS retrieves the geographic coordinates of the subscriber's address and transmits them to a HLR for entry into the subscriber's profile record. The latitude, longitude, and altitude information may be entered as precisely as the HLR administrator desires. The precision with which the position information is entered may be used to indicate the size of the subscriber's Home area. For example, a Home location entered in degrees and minutes may be the center of a Home area that is larger than an area surrounding a Home location entered in degrees, minutes, and seconds. In addition, each subscriber record may include more than one Home location, representing, for example, the subscriber's house and office, or his house and summer home. The subscriber record may also contain rate information indicating the rate to be charged to each subscriber when calling from a primary Home area, a secondary Home area, or other areas. This rate information is transferred from the HLR to the MSC upon location update via IS-41 qualification directives.

In addition to making post call-processing decisions such as billing determinations, the personal home areas of the present invention may also be utilized for pre-call-processing, i.e., call management decisions such as whether the subscriber should receive a call. For example, a subscriber may request that calls not be completed if the subscriber has wandered into an area of higher billing rates. In such a situation, the call may not be completed, or the subscriber may be provided with a distinctive ring that notifies the subscriber that the call is in a high rate area.

In addition, the present invention may be implemented in more than one network, under different operators. For example, a subscriber with a home street address in New York may designate that location as his/her primary Home area, and an address of a second home in Florida as a secondary Home area. As long as the New York and Florida operators have an automatic roaming agreement between themselves, the subscriber can still enjoy the benefits of lower rates when calling from either location.

The operation support system (OSS) is utilized for management of the telecommunications network, including signaling between the MSCs, the base stations, and the HLRs. In each MSC, each cell is assigned the geographic coordinates of the cell's base station, along with the known antenna type and the resulting radius of the cell. The MSC or a service control point (SCP) collects the current subscriber cell information, the subscriber Home area(s) definitions, the cell information (position, antenna type, and radius), and the subscriber's location to determine if the subscriber's call is set up in the Home area. The same algorithm may be utilized to change the charging rate at handoff or registration.

The present invention has the advantage of simplifying data administration for the operator, reducing the required coordination between the HLR and the MSC, and ensuring that changes to cell planning information in the MSC does not affect the Home area data for subscriber's in the HLR. Since each subscriber's Home area is defined in terms of latitude and longitude coordinates, the changing size of individual cells as system capacity increases does not affect the Home area data. Also, the amount of data is minimized since operators do not have to designate several cells instead of a single cell to represent the Home area of some subscribers. As shown in FIG. 1, information on at least three cells would otherwise have to be recorded in the HLR and passed to the MSC in order to designate and administer the subscriber's personal home area 10. Additionally, with the present invention, there is no effect on Home area data when cell planning requires the redistribution of cells from time to time as population growth in some areas exceeds local cell limitations. Therefore, data administration is greatly simplified for the operator.

Figure 2:
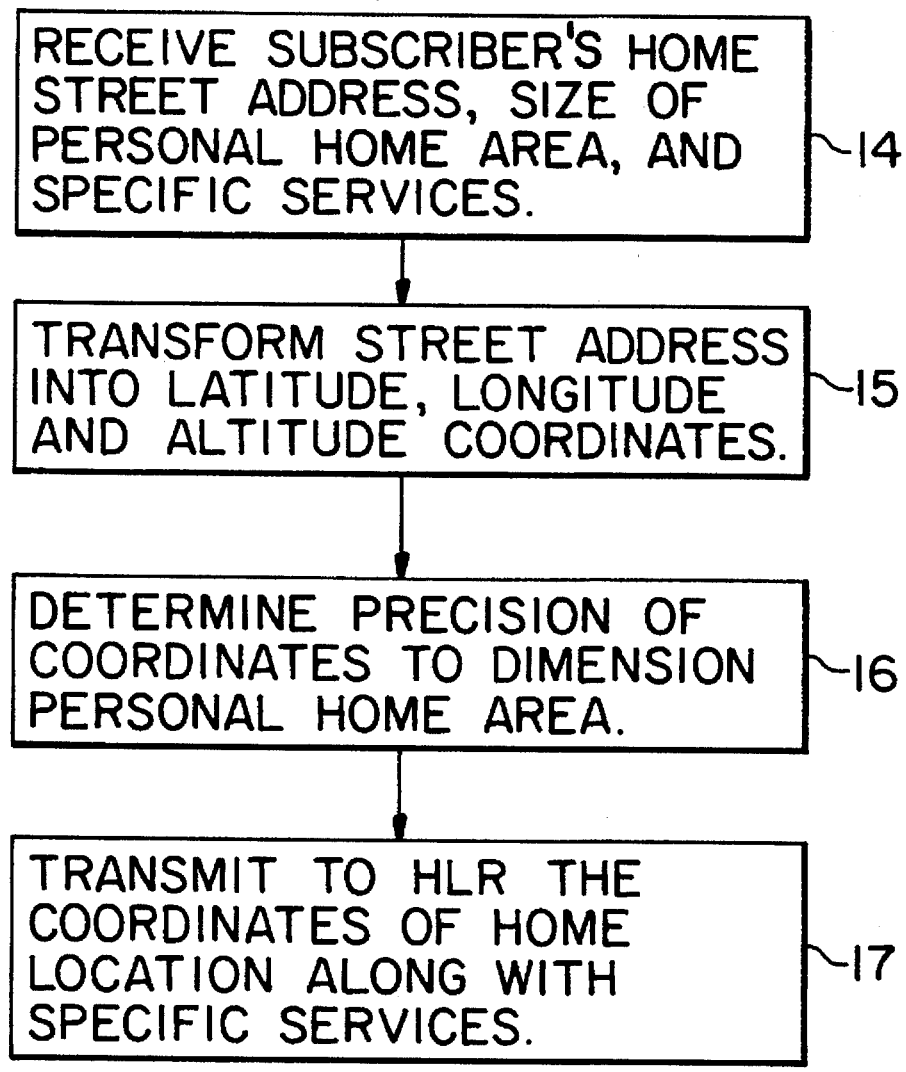
FIG. 2 is a flow chart illustrating the functions performed by a personal home area administering program in the operation support system (OSS) in the preferred embodiment of the present invention.

FIG. 2 is a flow chart illustrating the functions performed by a personal home area administering program in the operation support system (OSS) in the preferred embodiment of the present invention. The program begins at step 14 where an operator inputs a subscriber's home street address, the desired size of the subscriber's Personal Home Area, and the specific services that are to be applied to that home area. The desired size may be represented by a classification of the subscriber which is associated with a Personal Home Area size. The program then moves to step 15 where the program accesses a geographic information database and transforms the subscriber's home street address into latitude, longitude, and altitude coordinate information. At step 16, the program determines a degree of precision of the coordinates of the subscriber's address based upon the desired size of the subscriber's Personal Home Area. More precise coordinates, for example, may indicate a smaller home area. The program then moves to step 17 and transmits to the HLR the latitude, longitude, and altitude coordinates of the subscriber's Home location, along with the specific services that are to be applied within the Personal Home Area.

Several methods of locating mobile stations in a cellular network are known and may be utilized with the personal home areas of the present invention to determine whether a subscriber is in his/her Home area. U.S. Pat. Nos. 5,327,144 to Stilp et al., 5,235,633 to Dennison et al., and 5,043,736 to Darnell et al., all discussed above, disclose systems and methods of locating mobile stations either by measuring the differences in times of arrival of mobile station transmissions at several cell sites, or by satellite systems such as GPS, and are hereby incorporated by reference herein.

A disadvantage of these existing systems, however, is that they require either satellite positioning or major modifications to the cellular telephone network to allow synchronized transmissions from several different base stations. An alternative approach for time division multiple access (TDMA) systems is described in co-pending U.S. patent application Ser. No. 08/414,362, filed Mar. 31, 1995 by Daniel Dufour, is hereby incorporated by reference herein. Dufour discloses a mobile terminal locator for locating a mobile terminal in a cellular telecommunication system. Dufour identifies a search list of candidate handoff cells having sufficient signal strength to maintain a call with the mobile terminal. Initially, the search list may be the neighbor list or mobile assisted handoff (MAHO) list for the mobile terminal in its serving cell. An extended neighbor list or a subset of the neighbor list may also be utilized. Dufour then forces sequential handoffs of the mobile terminal from its serving cell to the candidate handoff cells and measures signal strength and propagation delay between the mobile terminal and each base station associated with each of the candidate handoff cells and between the mobile terminal and the serving base station. A distance is then calculated between the mobile terminal and each base station associated with each of the plurality of candidate handoff cells and between the mobile terminal and its serving base station. Then, arcs of possible locations of the mobile terminal, centered on the serving base station and each base station associated with each of the candidate handoff cells, are defined and their intersection point is calculated to define the location of the mobile terminal. The system of Dufour may operate in cellular telecommunication systems with or without synchronized timing reference signals from the base stations.

Figure 3:
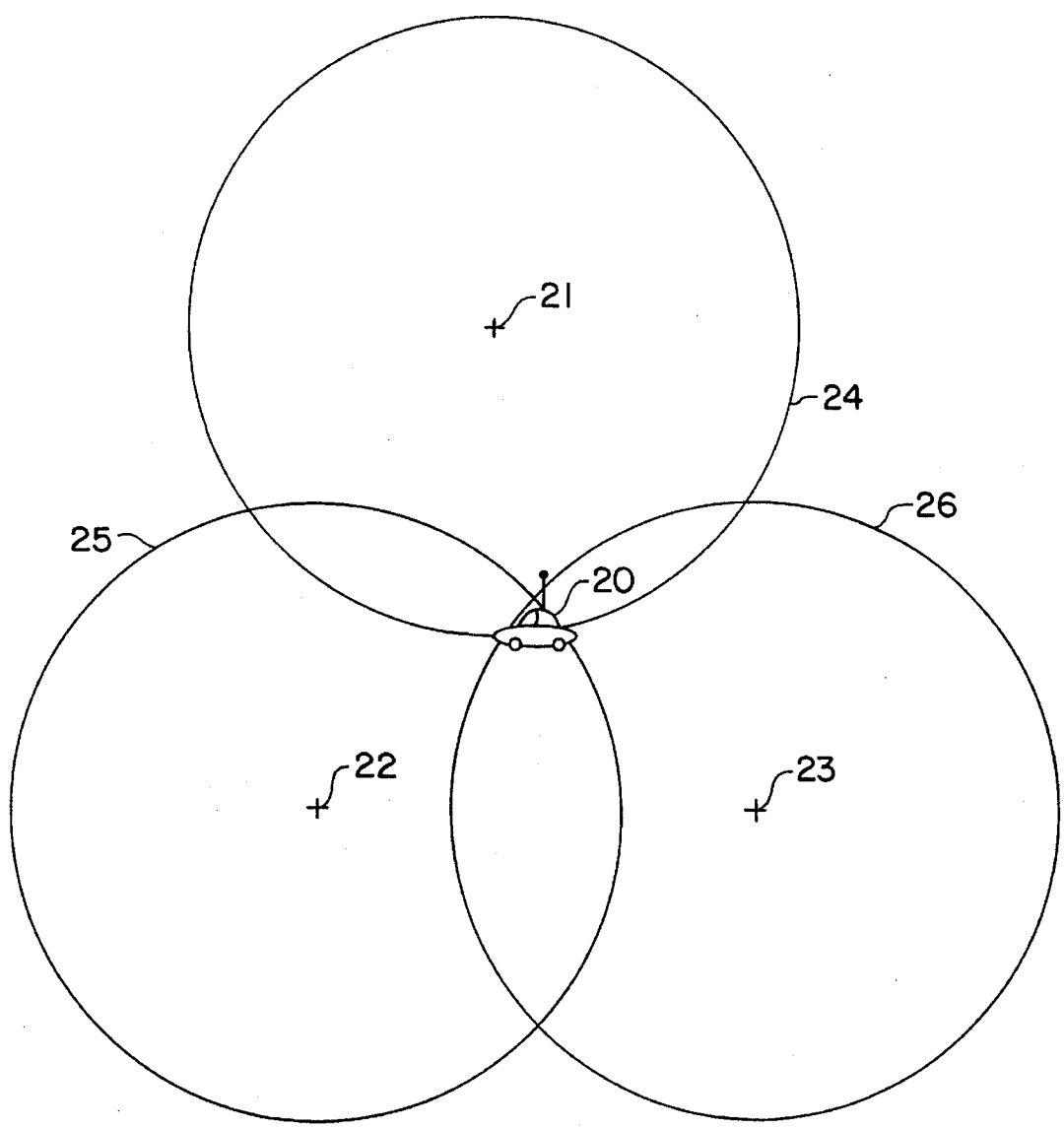
FIG. 3 is an illustrative drawing of a mobile station being located by measuring the differences in times of arrival of mobile station transmissions at several cell sites.

FIG. 3 is an illustrative drawing of a mobile station 20 being located by measuring the differences in times of arrival of mobile station transmissions at cell site base stations 21–23. The time required for a signal to travel from the mobile station 20 to a base station is indicative of the distance from the mobile station to the base station. Once the base stations 21–23 are synchronized to start timing when the mobile station 20 transmits a signal, the time of reception at the base stations 21–23 establishes radii 24–26 upon which the mobile station must be located. When three or more base stations receive the signal, then the mobile station 20 is located at the intersection of the three or more radii.

Once the position of the mobile station is known, the position is converted to latitude and longitude coordinates, and it is determined whether the mobile station is within the subscriber's Home area.

FIG. 4 is a flow chart illustrating the functions performed by a telecommunication system in which the present invention has been implemented and when a telecommunication service is invoked for a subscriber. The program begins at step 31 when a telecommunication service is invoked for a subscriber. The program then moves to step 32 where it is determined whether or not the invoked service is dependent on the location of the subscriber. If the service is not dependent on the location of the subscriber, the program advances to step 37 and executes the invoked service according to the service's normal parameters. If the service is dependent on the location of the subscriber, the program moves to step 33 and determines or obtains the current location of the subscriber utilizing one of the techniques described above. The program then moves to step 34 and determines whether or not the location of the subscriber is within the Personal Home Area of the subscriber. If the location of the subscriber is within the Personal Home Area of the subscriber, the program moves to step 35 and sets the service parameters for the invoked service to values utilized inside the Home area. For example, a lower billing rate may be set for calls inside the Home area. The program then moves to step 37 and executes the invoked service according to the set parameters. If, however, at step 34 it is determined that the location of the subscriber is not within the Personal Home Area of the subscriber, then the program moves to step 36 and sets the service parameters for the invoked service to values utilized outside the Home area. The program then moves to step 37 and executes the invoked service according to the set parameters.

It should be noted that the present invention is suitable for use with CDMA, TDMA, and GSM systems, as well as other types of similar networks.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for administering a personal home area for a subscriber within a cellular telecommunications network having a plurality of cell sites, said system comprising:

a home location register that stores geographic coordinates of a home location for said subscriber;

means for defining a personal home area centered on said home location of said subscriber;

means for determining a current geographic location of said subscriber upon invoking a service;

means for determining whether said current geographic location of said subscriber is located within said personal home area;

means for setting parameters for said service to values used inside said personal home area upon determining that said subscriber is located within said personal home area; and means for setting parameters for said service to values used outside said personal home area upon determining that said subscriber is not located within said personal home area.

2. The system for administering a personal home area of claim 1 wherein said home location register stores latitude and longitude coordinates and an altitude of said home location.

3. The system for administering a personal home area of claim 2 wherein said home location register also stores a radius value for said personal home area measured from said home location.

4. The system for administering a personal home area of claim 1 wherein said means for determining a current geographic location of said subscriber includes means for measuring, at said plurality of cell sites, differences in times of arrival of transmissions from said subscriber.

5. The system for administering a personal home area of claim 1 wherein said means for determining a current geographic location of said subscriber includes a NAVSTAR global positioning system.

6. The system for administering a personal home area of claim 1 wherein said means for determining a current geographic location of said subscriber includes:

a search list of candidate handoff cells having sufficient signal strength to maintain a call with said subscriber;

means for forcing sequential handoffs of said subscriber from a serving cell to said candidate handoff cells;

means for measuring signal strength and propagation delay between said subscriber and each base station associated with each of said candidate handoff cells and between the subscriber and the serving base station;

means for calculating a distance between the subscriber and each base station associated with each of the plurality of candidate handoff cells and between the subscriber and said serving base station;

means for defining arcs of possible locations of the subscriber, said arcs being centered on said serving base station and each base station associated with each of the candidate handoff cells;

means for calculating an intersection point of said arcs to define the subscriber's current location.

7. A method of administering a personal home area for a subscriber within a cellular telecommunications network having a plurality of cell sites, said method comprising the steps of:

storing in a home location register, geographic coordinates of a home location for said subscriber;

defining a personal home area centered on said home location of said subscriber;

determining a current geographic location of said subscriber upon invoking a service;

determining whether said current geographic location of said subscriber is located within said personal home area;

setting parameters for said service to values used inside said personal home area upon determining that said subscriber is located within said personal home area; and setting parameters for said service to values used outside said personal home area upon determining that said subscriber is not located within said personal home area.

8. The method of administering a personal home area of claim 7 wherein said step of storing in a home location register, geographic coordinates of a home location for said subscriber includes storing latitude and longitude coordinates and an altitude of said home location.

9. The system for administering a personal home area of claim 8 further comprising the step of storing in said home location register a radius value for said personal home area measured from said home location.

10. The method of administering a personal home area of claim 7 wherein said step of determining a current geographic location of said subscriber includes the step of measuring, at said plurality of cell sites, differences in times of arrival of transmissions from said subscriber.

11. The method of administering a personal home area of claim 7 wherein said step of determining a current geographic location of said subscriber includes the step of determining said location utilizing a NAVSTAR global positioning system.

12. The method of administering a personal home area of claim 7 wherein said step of determining a current geographic location of said subscriber includes:

identifying a search list of candidate handoff cells having sufficient signal strength to maintain a call with said subscriber;

forcing sequential handoffs of said subscriber from a serving cell to said candidate handoff cells;

measuring signal strength and propagation delay between said subscriber and each base station associated with each of said candidate handoff cells and between the subscriber and the serving base station;

calculating a distance between the subscriber and each base station associated with each of the plurality of candidate handoff cells and between the subscriber and said serving base station;

defining arcs of possible locations of the subscriber, said arcs being centered on said serving base station and each base station associated with each of the candidate handoff cells;

calculating an intersection point of said arcs to define the subscriber's current location.

* * * * *